United States Patent
Lakshmipathy et al.

(10) Patent No.: US 12,165,025 B2
(45) Date of Patent: Dec. 10, 2024

(54) PREDICTIVE, MACHINE-LEARNING, EVENT-SERIES COMPUTER MODELS WITH ENCODED REPRESENTATION

(71) Applicant: Cerebri AI Inc., Austin, TX (US)

(72) Inventors: Sathish Kumar Lakshmipathy, Round Rock, TX (US); Eyal Ben Zion, Toronto (CA); David Alexander Curry, Austin, TX (US); Alain Charles Briancon, Germantown, MD (US); Michael Henry Engeling, Austin, TX (US); Dmitrii Aleksandrovich Boldyrev, Richmond Hill (CA); Sara Amini, Fairfax, VA (US)

(73) Assignee: Cerebri AI Inc., Austin, TX (US)

( * ) Notice: Subject to any disclaimer, the term of this patent is extended or adjusted under 35 U.S.C. 154(b) by 0 days.

(21) Appl. No.: 18/180,077

(22) Filed: Mar. 7, 2023

(65) Prior Publication Data

US 2023/0222387 A1    Jul. 13, 2023

Related U.S. Application Data

(63) Continuation of application No. 16/868,385, filed on May 6, 2020, now Pat. No. 11,636,393.

(60) Provisional application No. 62/847,274, filed on May 13, 2019, provisional application No. 62/844,338, filed on May 7, 2019.

(51) Int. Cl.
| | |
|---|---|
| *A61N 1/00* | (2006.01) |
| *G06F 16/901* | (2019.01) |
| *G06N 5/01* | (2023.01) |
| *G06N 5/04* | (2023.01) |
| *G06N 20/00* | (2019.01) |
| *G06N 20/20* | (2019.01) |

(52) U.S. Cl.
CPC ......... *G06N 20/00* (2019.01); *G06F 16/9024* (2019.01); *G06N 5/01* (2023.01); *G06N 5/04* (2013.01); *G06N 20/20* (2019.01)

(58) Field of Classification Search
CPC .......... G06N 20/00; G06N 20/20; G06N 5/01; G06N 5/04; G06F 16/9024
USPC ................................... 707/600–899; 706/12
See application file for complete search history.

(56) References Cited

U.S. PATENT DOCUMENTS

| | | |
|---|---|---|
| 7,685,083 B2 | 3/2010 | Fairweather |
| 9,092,801 B2 | 7/2015 | Chang et al. |
| 9,092,802 B1 | 7/2015 | Akella |

(Continued)

OTHER PUBLICATIONS

Non-Final Office Action from related U.S. Appl. No. 17/962,118 issued on Jun. 21, 2023, pp. 1-28.

*Primary Examiner* — Isaac M Woo
(74) *Attorney, Agent, or Firm* — Pillsbury Winthrop Shaw Pittman, LLP

(57) ABSTRACT

Provided is a process including: obtaining, for a plurality of entities, entity logs, wherein: the entity logs comprise events involving the entities, a first subset of the events are actions by the entities, at least some of the actions by the entities are targeted actions, and the events are labeled according to an ontology of events having a plurality of event types; training, with one or more processors, based on the entity logs, a predictive machine learning model to predict whether an entity characterized by a set of inputs to the model will engage in a targeted action in a given duration of time in the future; and storing the trained predictive machine learning model in memory.

20 Claims, 4 Drawing Sheets

(56) References Cited

U.S. PATENT DOCUMENTS

| | | |
|---|---|---|
| 9,911,290 B1 | 3/2018 | Zalewski et al. |
| 10,713,794 B1 | 7/2020 | He et al. |
| 10,877,784 B1 | 12/2020 | Testuggine et al. |
| 11,636,348 B1 | 4/2023 | Tang et al. |
| 2002/0052873 A1 | 5/2002 | Delgado et al. |
| 2004/0095383 A1 | 5/2004 | Pfeifer et al. |
| 2009/0254971 A1 | 10/2009 | Herz et al. |
| 2010/0010823 A1 | 1/2010 | Scipioni et al. |
| 2011/0295621 A1 | 12/2011 | Farooq et al. |
| 2012/0137367 A1 | 5/2012 | Dupont et al. |
| 2013/0254182 A1 | 9/2013 | Tunstall-Pedoe |
| 2013/0282430 A1 | 10/2013 | Kannan et al. |
| 2014/0046777 A1 | 2/2014 | Markey et al. |
| 2015/0363694 A1 | 12/2015 | Banerjee et al. |
| 2016/0047662 A1 | 2/2016 | Ricci |
| 2017/0061294 A1 | 3/2017 | Weston et al. |
| 2017/0200152 A1 | 7/2017 | Winkler et al. |
| 2017/0286857 A1 | 10/2017 | Gaon et al. |
| 2018/0012130 A1 | 1/2018 | Taylor et al. |
| 2018/0052870 A1 | 2/2018 | Stojanovic et al. |
| 2018/0101771 A1* | 4/2018 | Schwarm ............... G06N 20/00 |
| 2018/0173372 A1 | 6/2018 | Greenspan et al. |
| 2019/0102700 A1 | 4/2019 | Babu et al. |
| 2019/0179858 A1 | 6/2019 | Douze et al. |
| 2019/0259041 A1 | 8/2019 | Jackson |
| 2019/0340684 A1 | 11/2019 | Belanger et al. |
| 2019/0347668 A1 | 11/2019 | Williams et al. |
| 2019/0361868 A1 | 11/2019 | Rogynskyy et al. |
| 2020/0012583 A1 | 1/2020 | Walters et al. |
| 2020/0126126 A1 | 4/2020 | Briancon et al. |
| 2020/0380389 A1 | 12/2020 | Eldeeb et al. |
| 2021/0090694 A1 | 3/2021 | Colley et al. |

* cited by examiner

PREDICTIVE, MACHINE-LEARNING, EVENT-SERIES COMPUTER MODELS WITH ENCODED REPRESENTATION

CROSS-REFERENCE TO RELATED APPLICATIONS

This patent is a continuation of U.S. patent application Ser. No. 16/868,385, titled PREDICTIVE, MACHINE-LEARNING, TIME-SERIES COMPUTER MODELS SUITABLE FOR SPARSE TRAINING SETS, filed 6 May 2020, which claims the benefit of U.S. Provisional Patent Application 62/844,338, having the same title, filed 7 May 2019; and this patent also claims the benefit of U.S. Provisional Patent Application 62/847,274, titled PREDICTIVE, MACHINE-LEARNING, LOCALE-AWARE COMPUTER MODELS SUITABLE FOR LOCATION-AND TRAJECTORY-AWARE TRAINING SETS, filed 13 May 2019. The entire content of each aforementioned application is hereby incorporated by reference.

BACKGROUND

1. Field

The present disclosure relates generally to predictive computer models and, more specifically, to predictive, machine-learning, time-series computer models suitable for sparse training sets.

2. Description of the Related Art

In a wide range of use cases, computer models are used to predict how non-deterministic entities, or complex entities with emergent properties, will behave in the future. Examples include predicting a stochastic time-series descriptive of weather, markets, or industrial processes, and the like. Examples include computer-implemented models configured to predict how human actors will behave, for example, those configured to predict health outcomes, product consumption, or various other actions by human actors.

Such computer models are often trained or otherwise configured based upon historical records of how those entities or similar entities have behaved in the past. Examples range in complexity from linear extrapolation in low dimensional systems to machine learning systems operative to make predictions based upon relatively high dimensional inputs that are descriptive of an entity.

SUMMARY

The following is a non-exhaustive listing of some aspects of the present techniques. These and other aspects are described in the following disclosure.

Some aspects include a process, including: obtaining, with one or more processors, for a plurality of entities, entity logs, wherein: the entity logs comprise events involving the entities, a first subset of the events are actions by the entities, at least some of the actions by the entities are targeted actions, and the events are labeled according to an ontology of events having a plurality of event types; training, with one or more processors, based on the entity logs, a predictive machine learning model to predict whether an entity characterized by a set of inputs to the model will engage in a targeted action in a given duration of time in the future; and storing, with one or more processors, the trained predictive machine learning model in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
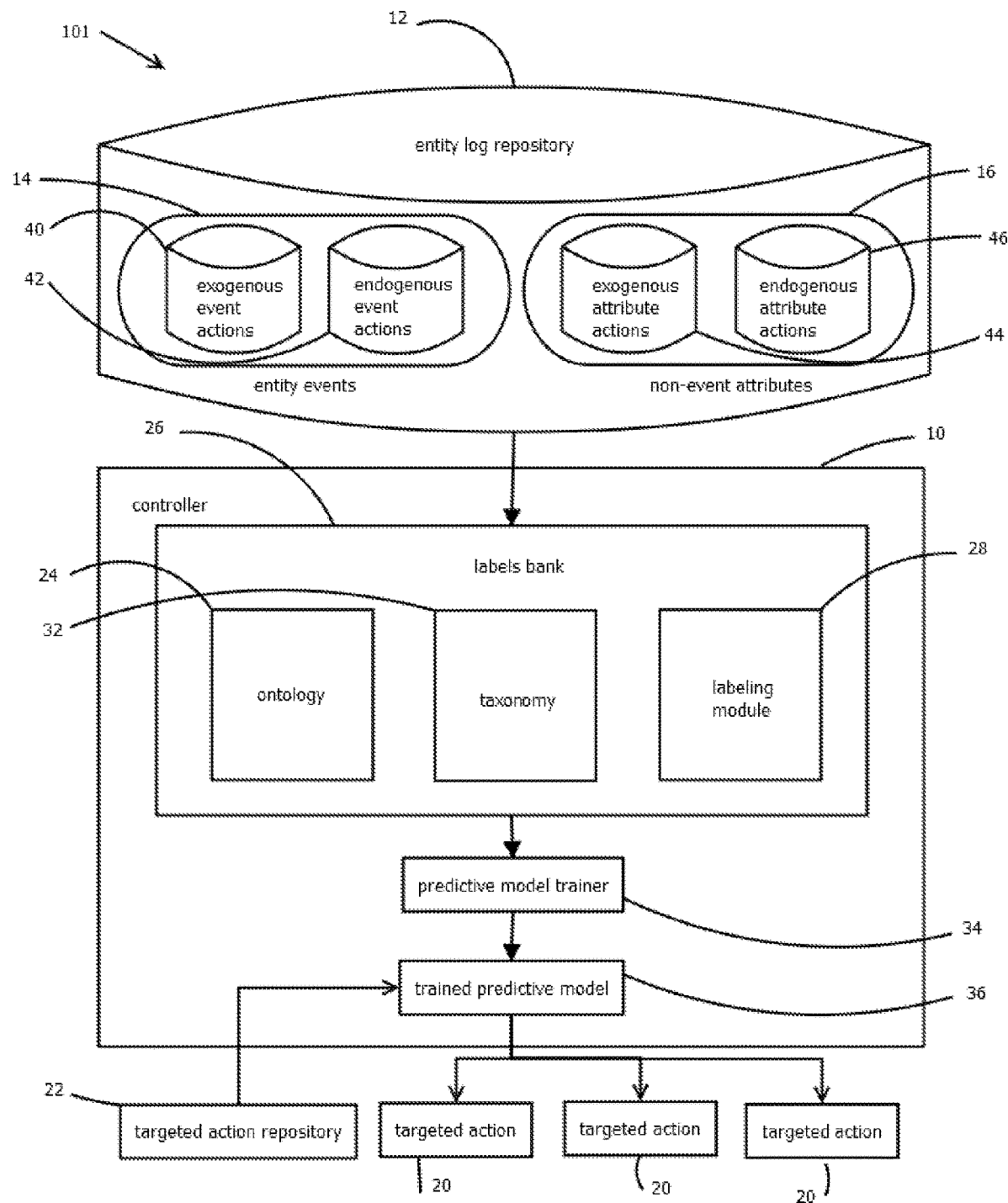
FIG. 1 is a block logical and physical architecture diagram showing an embodiment of a controller in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many existing computer models are not well suited for use cases with sparse training data, e.g., cases in which the historical records exhibit relatively few instances of outcomes that are being predicted or signals predictive of those outcomes relative to the number of historical records, complexity of the system being modeled, or need for the system to generalize out of sample. In many cases, feature engineering imposes information loss that aggravates these challenges. For example, some computer models naïvely bin events into ranges of time without regard to how recent those events are relative to examples of outcomes being predicted in the historical records and without regard to how frequent those events are within the time bins. The resulting loss of information often leads to higher rates of type I and type II errors from many existing computer models. None of which is to suggest that this type of feature engineering is disclaimed or that any other description of advantages or problems constitutes disclaimer elsewhere herein, as some embodiments may implement this type of feature engineering in conjunction with other features having different properties.

The present techniques have use cases relevant to continuous inputs, like dimensions of time and location, or other values having the similar properties. As such, the discussion below is organized by first addressing techniques related to time and then geolocation, but it should be emphasized that these techniques may be combined, which is not to suggest that any other set of features designed here cannot also be combined.

Time-Series Computer Models

Some embodiments mitigate some of the above-describe challenges with certain classes of machine learning models configured to be trained on and predict based on engineered features that account for particular measures of recency and frequency of events, including targeted actions and non-targeted actions, preceding targeted outcomes, referred to herein as targeted actions. In some embodiments, these techniques may be implemented in conjunction with the predictive systems described in U.S. patent application Ser. Nos. 15/456,059; 16/151,136; 62/740,858 and 16/127,933, the contents of which are hereby incorporated by reference, e.g., by leveraging the data models therein, providing outputs that serve as features thereof, or taking inputs from these systems to form input features of the techniques described herein. In some embodiments, the described time-series records may serve as the historical records or other types of entity logs upon which systems are trained and to which systems are responsive at inference time. In some embodiments, the privacy preserving techniques may be implemented with the approaches described herein. In some cases, the multi-stage machine learning models described may include a stage corresponding to the models described herein.

The physical architecture may take a variety of forms, including as monolithic on-premises applications executing on a single host on a single computing device, distributed on-premise applications executing on multiple hosts on one or more local computing devices on a private network, distributed hybrid applications having on-premises components and other components provided in a software as a service (SaaS) architecture hosted in a remote data center with multi-tenancy accessed via the network, and distributed SaaS implementations in which various subsets or all of the functionality described herein is implemented on a collection of computing devices in one or more remote data centers serving multiple tenants, each accessing the hosted functionality under different tenant accounts. In some embodiments, the computing devices may take the form of the computing device described below with reference to FIG. 4.

In some embodiments, training data and inputs at inference time may be, or be based on, entity logs. Examples include records each describing a history of events associated with an individual respective entity, e.g., with a one-to-one mapping of logs to entities or with shared logs. In some cases, these events are events describing exogenous actions that impinge upon the entity, like messages sent to the entity, news events, holidays, weather events, political events, changes in vendors to an industrial process, changes in set points to an industrial process, and the like. In some cases, these events describe endogenous actions performed by the entity, like a purchase, a warranty claim, an insurance claim, a default, a payment of a debt, presenting with a health problem, and out-of-tolerance industrial process metric, process yield, weather phenomenon, and the like. In some embodiments, the events are labeled with some indicia of sequence, like an indicia of time, for instance with date stamps or other types of timestamps. In some embodiments, the event logs are records exported from a customer relationship management system, each record pertaining to a different customer, and which may include the result of various transformations on such records.

In some embodiments, entity logs may further include non-event attributes. The non-event attributes may include attributes of people, like psychometric or demographic attributes, like age, gender, geolocation of residence, geolocation of a workplace, income, number and age of children, whether they are married, and the like. In some embodiments, the non-event attributes may include attributes of a datacenter, for instance, a security rating, access protocols, a cooling capacity, an inventory of HVAC equipment therein, a volumetric flow rate maximum for fans, or other industrial processes controlled over time. In some cases, such attributes may include values indicating transient responses to stimulus as well.

FIG. 1 is a schematic block diagram of an example of a controller 10, operating within a computing system 101, in which the present techniques may be implemented. In some embodiments, the computing system 101 may include an entity log repository 12, which in some cases may include entity events 14, comprising exogenous event actions 40 or endogenous event actions 42, and non-event attributes 16, comprising exogenous attribute actions 44 or endogenous attribute actions 46. Entity events may include targeted actions, non-targeted actions, or both. The computing system 101 may further include a plurality of potential targeted actions 20, a targeted action repository 22.

In some embodiments, a targeted action 20 may be assigned with an occurrence likelihood of an entity get engaged with the targeted action 20. In some embodiments, an occurrence likelihood may be predicted for a duration of time in the future that an entity will get engaged with the targeted action 20. In some embodiments, a plurality of occurrence likelihoods may be predicted for an entity to get engaged with a plurality of targeted actions 20.

In some embodiments, a controller 10 may include an ontology 24 or a taxonomy 32 within a labels bank 26, which may include a labeling module 28 configured to classify entities in the repository by labeling those entries with values in the ontology 24 or the taxonomy 32 to which the entries correspond. In some embodiments, the events may be organized into a taxonomy or ontology of events. In some embodiments, the events are labeled with classifications or with scores, like in dimensions of a vector, indicating a degree to which particular properties are exhibited by the event in the taxonomy or ontology. In some embodiments, the taxonomy is a hierarchical taxonomy.

In some embodiments, the labels bank 26 may employs ontology 24 for semantic implementation to classify the entities in the repository. Ontology 24 is configured to identify and distinguish entities, events and their relationships. In some embodiments, ontology implementation is based on predetermined or real-time detected patterns. In some embodiments, ontology semantics include exploring certain relationships between events related to different entities to recognize patterns of events.

In some embodiments, such as those related to use cases with sparse training dataset in which the historical records exhibit relatively few instances of outcomes that are being predicted, detection and recognition of events, via ontology, may result in finding similar events and non-event attributes related to other entities that may be injected into an event stream of an entity to enrich the training dataset.

In some embodiments, ontology 24 semantics may be used to detect what events would not provide meaningful reconstruction of history. Such events may be removed from the training dataset.

In some embodiments, the ontology may have multiple layer (e.g. primary level and secondary level) ordered in a hierarchical taxonomy. For instance, in some embodiments related to the financing industry, the primary level of the ontology is customer care and the secondary levels include (and are not limited to, which is not to suggest that other descriptions are limiting) to call from the bank, email from the bank, mail from the bank, send a brochure from the bank, send from the bank and online secure message. Another primary level of the anthology is deposit and the secondary level include (and are not limited to, which is not to suggest that other descriptions are limiting) to dividends received, interest credited, credited amount, wire transfer received, interest on savings account, e-transfer, check deposit. Another primary level of the anthology fee and the secondary level include (and are not limited to, which is not to suggest that other descriptions are limiting) to apply a withdrawal fee, foreign currency fee, and balance below a certain threshold, Another primary level of the anthology is marketing and the secondary level includes (and is not limited to, which is not to suggest that other descriptions are limiting) to call from the bank, email from the bank, mail from the bank, send a brochure from the bank, and send from the bank an online secure message. Another primary level of the anthology is payment and the secondary level includes (and is not limited to, which is not to suggest that other descriptions are limiting) to make loan payments, loan interest rate, debit card transaction, check debit, insurance payment, e-transfer, periodic deposits, credit card transaction. Another primary level of the anthology is service and the secondary level includes (and is not limited to, which is not to suggest that other descriptions are limiting) to debited amount characterization, credited amount characterization, changing account holder information, changing account holder function, adding new account holder, account balance, opening account, and closing account. Another primary level of the anthology touchpoint and the secondary level includes (and is not limited to, which is not to suggest that other descriptions are limiting) to call from the bank, email from the bank, mail from the bank, send a brochure from the bank, send from the bank an online secure message, dividends received, interest credited, credited amount, wire transfer received, interest on savings account, e-transfer, check deposit, withdrawal fee, foreign currency fee, balance below a certain threshold, call from bank, email from bank, mail from bank, brochure from bank, send from the bank an online secure message, loan payments, loan interest rate, debit card transaction, cheque debit, insurance payment, e-transfer, periodic deposits, credit card transaction, loan delinquency fee, late statement payment fee, overdraft fee, negative balance fee, debited amount characterization, credited amount characterization, changing account holder information, changing account holder function, adding new account holder, account balance, opening account, closing account, and email to the bank. Another primary level of the anthology is transfer and the secondary level includes (and is not limited to, which is not to suggest that other descriptions are limiting) to transfer of funds, credit card bill payment, and cash withdrawal.

In some embodiments, the specified type of action is an action among a set of actions that is a subset of entries in the taxonomy. In some embodiments, the specified type of action is an action having a numerical score within a specified range. In some embodiments, the specified type of action is a collection of actions that produce an aggregate score based on a weighted combination of numerical scores within a specified range. Specified ranges may be greater than the value, less than a value, or between a maximum and minimum value, inclusive or exclusive of the maximum and minimum value. In some embodiments, the specified type of event is a pattern of events, like a pattern of event satisfying something like a regular expression or otherwise satisfying criteria of a rule. Examples include alternating patterns of different types of events, rule specifying some of events and indicating wildcard event types that match a plurality of different types of events are all events for others.

Aggregating all (or a subset of) events over the lift time of the customer, in some use cases, and for some embodiments, would give features to predict on but they tend have older information that may be noisy and might give weight to all events happening to a customer. For instance, a marketing email sent 5 years ago might not play a role in making the decision to purchase the car today, but a vehicle offer from last month would. But, some of the historic information such as total number of vehicles a customer bought from the same dealership should be included given that it shows brand commitment. Ontology semantics and taxonomy semantics may be applied to classify and sort entity-related events and non-event attributes.

In some embodiments, ontology semantics may use feature engineering to classify and sort different types of features (e.g. events and non-event attributes). Feature engineering includes (e.g., non-exclusively, which is not to suggest that other references to the term "include" are exclusive) recency feature engineering, frequency feature engineering, lag feature engineering, difference feature engineering, harmonic analysis feature engineering.

Recency features may leverage the last time an event took place. In some embodiments, the recency features are calculated by counting a number of time units (days, minutes) (or sequence positions) since the last time an event type (or abstracted event type based on an ontology) occurred. In some embodiments, event types that are taken place within a specific time window can be combined into a single event. This is expected to be helpful when multiple activities are recorded as part of a single service event (like the different tasks of a service appointment) or multiple objects in a single purchase event.

Frequency features may capture how often a specific event type or multiple event types (as a combination) occurs in a defined time window (or sequence range) for the problem. In some embodiments, frequency features are calculated by summing of interaction events occurring in a pre-defined (or dynamically defined) or optimized aggregation window.

Lag feature engineering may be used to organize timelines into periods (or lagging ranges in a sequence). In some embodiments, periods have a constant duration. In some embodiments, periods have varied durations (to accommodate holydays for instance). In some embodiments, the system adds one or more event occurrence of a previous period to the period of choice. Lag feature engineering can be combined with other types feature engineering (which is not to suggest that other features herein are not also amenable to variation). In some embodiments, the rolling, expanding, frequency and recency features may be lagged along with non-lagged features.

In some types of difference features engineering, the features may be generated by creating the difference of a given feature of any kind (recency, frequency, lag, etc.) between two consequent periods or subsequent periods.

Using some forms of difference feature engineering, some embodiments may make time sequences or time series stationary, making them easier to model and thereby reducing dimensionality of inputs. In some embodiments, differences remove trends from the time series. In some embodiments, the different removes seasonality. For time series with a seasonal component, the lag may be expected to be the period (width) of the seasonality. Difference can (a term which is used interchangeably with the word "may" herein) be repeated more than once until all temporal dependencies has been removed.

In some embodiments, a log difference is used. This is expected to be especially useful for commercial, financial, and economic applications. One advantage of log difference, in some cases, is symmetry: Going from 100 to 10 is a log 10 difference of −1, it is a decrease of 90%. Going from 100 to 1000 is also a log difference of 1, but corresponds to an increase in value of 900%. That said, embodiments are not limited to systems that afford this advantage, which is not to suggest that other descriptions are limiting.

In some embodiments, modal feature engineering, such as moving average, median, mode (or other measures of central tendency), standard deviation, variance, or kurtosis (or other measures of variation) over a rolling temporal or sequence-range window can be used if the data was not too sparse (e.g., when the input data provides enough number of events of the same type in data).

Harmonic analysis feature engineering may be used in some embodiments to decompose an input time series or sequence into a sum of weighted and shifted cosine and sine functions. The Fourier, sine, or cosine transforms can be used for this decomposition. Some embodiments may transform inputs from the time or sequence domain into the frequency domain and, in some cases, transform continuous values in the frequency domains into categorical values by binning.

In addition to creating new features through feature engineering, some embodiments may also reduce a number of features to improve performance of the model. In some embodiments, one take advantage of Bayesian Networks to figure out the dependency level among features set such that the Markov blanket of a significant event would give the optimal set of features that are required to build the model. Some embodiments may compute or approximate Shapley values for candidate features and prune features determined, by this measure, to contribute less than a threshold amount to model performance.

In some embodiments, a logistic regression method using Lasso and ElasticNet penalty functions may used to reduce the number of features. A regression method may apply a least absolute shrinkage and selection operator (e.g., Lasso). Other examples of regression methods that may be used include Elastic Net and Tikhonov regularization. In some embodiments, a Pearson correlation may be used for feature reduction.

The preceding and related forms of feature engineering may be combined in a single feature, and different features may have different forms of the above types of feature engineering, in either case, in any suitable permutation.

Figure 2:
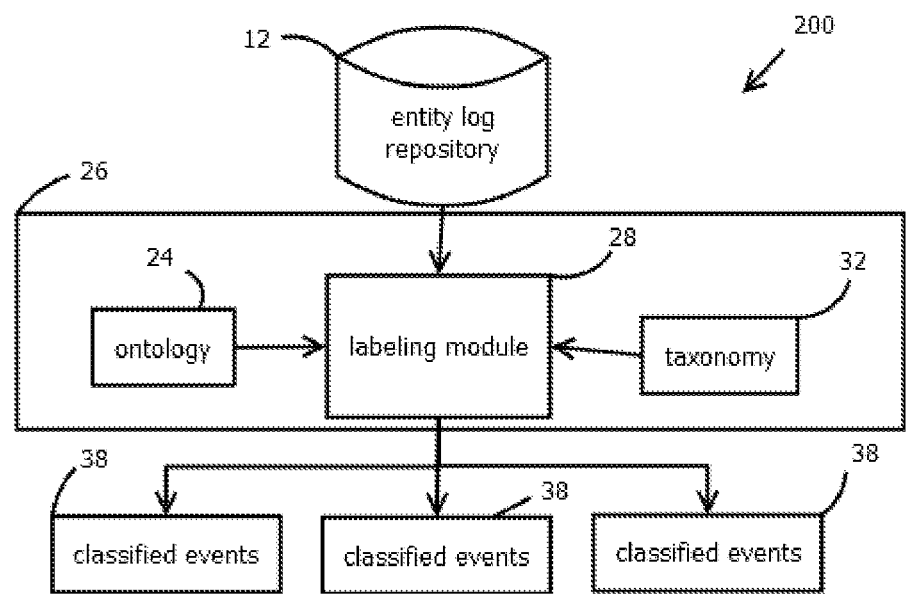
FIG. 2 is a block diagram showing an embodiment of a labels bank 26 in accordance with some of the present techniques.

An example of classification process 200 within a labels bank 26 in accordance with some embodiments is illustrated in FIG. 2. In some embodiments, events related to an entity, obtained from entity log repository 12, are passed through a labeling module 28. Labeling module 28 ensure (or otherwise enhance) consistency of events based on ontology 24 semantics, taxonomy 32 semantics, or both to obtain a plurality of classified events 38. Ontology 24 semantics and taxonomy 32 semantics may (e.g., each) include multiple patterns, logical structures, or rules to detect the semantic meaning and relationship interconnections between the events. Ontology 24 semantics and taxonomy 32 semantics may detect relationship interconnections between the events, e.g., using both events and non-event (e.g., immutable) attributes of entities.

In some embodiments, a labeling module 28 may create a plurality of event periods (which may be periodic, aperiodic, or non-repeating), based on the events timelines, e.g., and module 28 may be so configured using lag feature engineering. Each period of the plurality of event periods may be scored based on the type of events in each period and their level of impact, calculated by ontology 24 semantics and taxonomy 32 semantics, on a targeted action. For instance, a lipstick bought 5 years ago might not play a role in making the decision to purchase the next cosmetic item, but a contour from last month would. On the other hand, some of the historic information, such as total number of red nail polishes a customer bought from the same brand, may be included given that it shows brand commitment.

A plurality event periods may have an equal or varied durations, may have overlapping event periods, and may be adjacent to each other or separated. For example, a first event period may be January of 2020, a second even period may be December of 2019, adjacent to the first period and same duration, and a third period may be Jan. 31, 2020, overlapping with the first period, separated from the second period and shorter duration than both the first and the second periods.

In some embodiments, a plurality of event periods may include long-term periods (e.g. a week, a month, or a year), medium-term periods (e.g. an hour, 2 hours, 6 hours, 12 hours, or a day), and short-term periods (e.g. 1 second, 1 minutes, 5 minutes, or 10 minutes) with different scores assigned to each period based on a targeted action and the events in each period. For example, there may be a much higher chance that a consumer buys a cable TV subscription (which may be an example of a targeted action) if the consumer has searched home internet bundles in the last 10-minutes (short-term period) compared to if the consumer did the same search a month ago (same event type but in a long-term period). In another example, there may be a much lower chance that an individual buys a new car (which may be an example of a targeted action) if the consumer has leased a new car in the last 12-hours (which may be an example of a medium-term period) instead of a year ago (e.g., same event type but in a long-term period). In another example, there is a much lower chance that an individual buys a new coffee table (which may be an example of a targeted action) if the consumer has bought a new sofa in the last 24-hours (which may be an example of a medium-term period) instead of a pair of sunglasses (same period but different type of event).

In some embodiments, patterns may include predetermined patterns, dynamically defined patterns, or both. Patterns may include combinations of singular event types, event streams, and other patterns. Real-time detected patterns may be dynamically recognized within events by ontology 24 semantics or taxonomy 32 semantics. The combination of predetermined patterns and real-time detected patterns may facilitate operations by labeling module 28 to dynamically detect new behavior and trends and adjust the classification of entities accordingly.

In some embodiments, the controller 10 may be configured to execute the process described below with reference to FIG. 3. In some embodiments, the controller 10 is operative to train models that account for the above-described use cases with sparse training data in which the historical records exhibit relatively few instances of outcomes that are being predicted.

In some embodiments, the controller 10 may train a model based on the entity log repository 12 to predict whether an entity characterized by a set of inputs to the model will engage in a targeted action, such as the actions within the targeted action repository 22, in a given duration of time in the future as described in greater detail below with reference to FIG. 3.

In some embodiments, the controller 10 is configured to score, rank, or otherwise select candidate actions responsive to information in the entity events 14 with the trained model. In some cases, those candidate actions are stored in a targeted action repository 22. The term "repository" is used broadly to include structured arrangements of data (e.g., one or more of such arrangements), such as in relational databases, NoSQL databases, data structures in program state (like key-value pairs, objects in an object oriented programming language, arrays, lists, and the like), documents (like hierarchical serialization data format documents, such as JavaScript object notation or extensible markup language documents), and the like. In some embodiments, the actions include those described as being selected among in U.S. patent application Ser. No. 15/456,059, titled BUSINESS ARTIFICIAL INTELLIGENCE MANAGEMENT ENGINE, the contents of which are hereby incorporated by reference.

Figure 3:
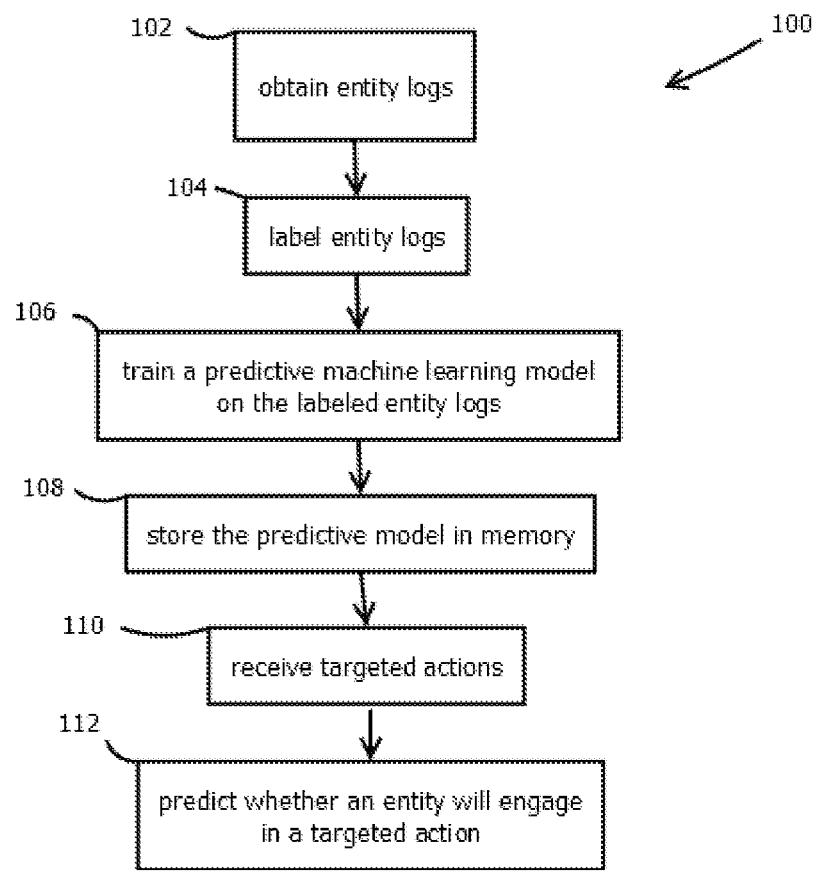
FIG. 3 is a flowchart showing an example of a process by which occurrence likelihood of a targeted action is predicted in use cases with sparse training data.

In some embodiments, the controller 10 may execute a process 100 shown in FIG. 3. In some embodiments, different subsets of this process 100 may be executed by the illustrated components of the controller 10, so those features are described herein concurrently. It should be emphasized, though, that embodiments of the process 100 are not limited to implementations with the architecture of FIG. 1, and that the architecture of FIG. 1 may execute processes different from that described with reference to FIG. 3, none of which is to suggest that any other description herein is limiting.

In some embodiments, the process 100 may be implemented with program code or other instructions stored on a tangible, non-transitory, machine-readable medium, such that when the instructions are executed by one or more processors (a term which as used herein refers to physical processors, e.g., implemented on a semiconductor device or other computing substrate), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, or the processes described may otherwise be varied, again none of which is to suggest that any other description herein is limiting.

In some embodiments, the process 100 includes obtaining, as indicated by block 102, for a plurality of entities, entity logs, wherein the entity logs may be events or non-event attributes involving the entities. In some embodiments, at least a subset of the events are actions by the entities and some of these actions may be targeted actions. In some embodiments, these entity logs may be labeled, as indicated by block 104, via a labels bank 26, which may include a labeling module 28 configured to classify entities in the repository, as shown in FIG. 1.

Some embodiments may train a predictive machine learning model, as indicated by block 106, for example, with the predictive model trainer 34 of FIG. 1. In some embodiments, the model is responsive to various features that serve as input to the model, e.g., numerical features or categorical features.

In some embodiments, some or all of the ingested entity logs may serve as, or be used to form, features of the model. In some embodiments, some of the features to which the model is responsive and upon which the model is trained, may be computed from the entity log. Some features may be numerical features and some features may be categorical features, for example, indicating whether one or more events in the entity log satisfied various criteria. In some embodiments, the features may be numerical or categorical features indicative of recency of events relative to targeted actions.

Examples include features that classify an entity log or targeted action therein according to whether a specific type of other event occurred within a threshold duration prior to that targeted action. Examples include features that classify an entity log or targeted action therein according to whether a specified type of event occurred within a specified duration of time before or after that targeted action. Other examples include features that classify an entity log or targeted action therein in these manners according to whether more than a threshold amount of instances of the specified event occurred within the specified duration of time.

Examples of numerical features include an amount of time before a targeted action that a specified type of event occurred or a time weighted version thereof, like a half-life score in which the weight attributed to the specified type of action decreases exponentially as the amount of time before the targeted action increases. Other examples of numerical features include a frequency or other indication of a number of times the specified type of event occurred before the targeted action.

In some embodiments, the number of features in a record upon which the model is trained or to which the model is responsive, which in some cases may be characterized as a feature vector, may be relatively large, for example, having more than 5, more than 20, more than 50, or more than 500 features. In some embodiments, the number of entity logs upon which the model is trained may also be relatively large, for example more than 500, more than 5000, more than 5,000, or more than 50,000 different entity logs corresponding to different entities histories.

In some cases, training may be executed as a batch process periodically or in response to some event. Or some embodiments may train the model while the model is in use with real-time learning (e.g., adjusting model parameters within five minutes, one minute, or one second of obtaining feedback or other new entity log upon which to train). In some embodiments, training may be executed concurrently while a previously trained version of a model is used to make predictions based upon out of sample entity logs. In some embodiments, training includes iteratively adjusting model parameters in directions that minimize or maximize an output of an objective function, like a lost function or fitness function, based upon application of the model to at least some of the training data in the current form of the model. For example, some embodiments may train model parameters with various forms of gradient descent, like stochastic gradient descent with momentum. Some embodiments may compute partial derivatives of model parameters with respect to the objective function and iteratively adjust the model parameters in a direction that the partial derivative indicates will locally tend to decrease loss or increase fitness, depending upon the type of objective function. Some embodiments may iteratively repeat this process until a threshold number of iterations of occurred or until an amount of change in the outcome of the objective function is less than the threshold amount between consecutive iterations.

In some embodiments, the model is a deep neural network, for example, a long short-term memory model having cycles that may be unrolled during training to account for sequences that unfold over time. In some embodiments, the model is an autoencoder with attention (e.g., with multi-head self-attention) configured to map sequences of inputs to vector representations in a space in which at least some dimensions correspond to the predicted likelihood of engaging in various targeted actions. In some embodiments, the model is a hidden Markov model (e.g., a 2, 4, or 6 or higher level HMM or other type of dynamic Bayesian network) having a transition probability matrix trained with Baum-Welch or Viterbi processes and configured to predict the likelihood of engaging in various behaviors conditional upon previous sequences of events. In some embodiments, the variations of models described may be combined with ensemble techniques like those described below.

In some embodiments, the model is a decision tree, like a classification tree, that is trained with the classification and regression tree (CART) procedure. Some embodiments may iteratively split a feature space (of the features of an input to which the model is responsive) along planes orthogonal to dimensions corresponding to the different features of the inputs to the model. In some embodiments, the value along those axes at which a split is applied may be selected by determining which value minimizes a measure of impurity with respect to whether the targeted action (or targeted actions) occurred (e.g., subsequently relative to the evens upon which the features are based) on each side of the split. For example, values may be selected that tend to concentrate data points (e.g., feature vectors) in which the targeted action occurred on one side of the split and data points in which the targeted action did not occur on the other side of the split. Various measures of impurity may be applied, including entropy and Gini impurity. In some embodiments, which dimension is selected for the split may be determined with a greedy optimization algorithm by determining which of the on split dimensions, when split in this manner, affords the smallest measure of resulting impurity. Some embodiments may repeat this procedure, in some cases, recursively, until a stopping criterion is satisfied. Examples include determining whether less than a threshold amount of data points remain within leaf nodes of the resulting tree or more than a threshold number of splits have been performed, each, when satisfied causing cessation of splitting. Some embodiments may prune the resulting tree (e.g., removing a threshold number of the most recent splits).

The resulting tree may specify dimensions and values along those dimensions upon which to split based upon values of features, for example by removing a threshold number of branches of the resulting tree adjacent leaf nodes. At inference time, a feature vector may be applied to each of the splits in sequence, determining whether the vector falls on one side of the split or the other, before repeating for splits within that selected volume. The final leaf node may be labeled as indicating a targeted action is predicted or not based on whether a majority of training examples in that volume had that targeted action.

In some cases, a plurality of decision trees may be trained and their outputs aggregated with various ensemble methods. For example, some embodiments may implement bootstrap aggregation. Some embodiments may sample from the training data, for instance by randomly sampling with replacement, to form a plurality of different training data sets on subsets of the training data. Some embodiments may train a different decision tree on each of the different subsets of training data. At inference time (i.e., when using the model to make predictions, in contrast to the training phase), some embodiments may then average the predictions of the resulting plurality of trees to produce an output of the aggregated model. Some embodiments may implement a random force approach to this technique. Some embodiments may form the subsets of training data by randomly sampling both which records are used and randomly sampling which features are used in training. Thus, some trees may have different sets of dimensions upon which splits are determined.

In another example, some embodiments may implement boosting as the ensemble method. Some embodiments may sequentially train decision trees, using the earlier trained decision trees to make preliminary predictions, and then training the later trained decision trees on errors in those predictions to reduce those errors. Some embodiments may implement gradient boosting. For example, some embodiments may train a sequence of trees in which subsequent trees attempt to learn the difference between predicted and actual values from the previous tree in the sequence by minimizing an error function over the training data subset. Some embodiments may implement stochastic gradient boosting, and some embodiments may down weight gradient boosted trees according to model complexity.

As a result, some embodiments may produce a trained predictive model, as indicated by block 36 in FIG. 1.

Some embodiments may store the resulting predictive model in memory, as indicated by block 108, an instantiation of the trained predictive model 36 shown in FIG. 1. As noted, trained models may be expressed as a lookup table mapping inputs to outputs, sets of values for constants or variables in software routines, as values of parameters in closed-form equations, or combinations thereof.

In some embodiments, the trained model may then be used to predict whether an entity characterized by a set of inputs to the model will engage in a targeted action in a given duration of time in the future based upon features of entity logs indicative of recency of events prior to targeted actions. To this end, some embodiments may receive targeted actions, as indicated by block 110 in FIG. 3, for instance, with the trained predictive model 36 shown in FIG. 1. Some embodiments may then predict whether an entity will engage in the targeted actions 110, as indicated by block 112 in FIG. 3, for instance with a potential targeted action 20 in FIG. 1.

The resulting trained model may be applied in a variety of use cases. Examples include computer systems responsive to real-time requests for predictions and batch processes on collections of entity logs. For example, some embodiments may respond to requests received a server with an entity log by transforming the entity log into a collection of features; inputting those features into the trained model; and outputting a value indicative of a predicted likelihood of the entity engaging in a targeted action. Some embodiments may output a plurality of values corresponding to different targeted actions. Some embodiments may output a plurality of values corresponding to whether the targeted action occurs within different windows of time in the future. In some cases, the output value is a binary classification, or in some cases, a score is output indicative of the probability of the predicted action occurring (e.g., corresponding to the percentage of examples in a leaf node of a tree in which the targeted action occurred). In some embodiments, different models may be trained to produce these different values, or the same model may be trained to output multiple outputs. In some embodiments, a collection of entity records, for example, extracted from a customer relationship management database, may be ingested and filtered or ranked according to predicted likelihoods of engaging in targeted behavior.

The predictions may have a variety of use cases. Some embodiments may predict whether a consumer is likely to make a purchase and determine whether to cause an advertisement to be conveyed to the consumer, e.g., whether to cause some form of message be to be conveyed to the consumer via email, text message, phone call, mailer, or the like, or a discount should be offered to the consumer. Some embodiments may predict whether a consumer is likely to submit a claim under a warranty and determine whether that consumer is qualified to be offered a warranty or price of the warranty. Some embodiments may predict whether the consumer is likely to pay off debt and determine whether the consumer should be offered a loan or credit card and terms, like interest rate or amount that can be borrowed. Some embodiments may predict whether a person is likely to become ill and determine whether that person should be offered insurance or terms of the insurance, like deductible or maximum coverage. Some embodiments may predict whether an industrial process, like an oil refinery, plastic manufacturing plant, or pharmaceutical manufacturing plant, is likely to operate out of tolerance and determine whether preventative maintenance is warranted.

Some embodiments may implement other types of models to accommodate sparse training sets. For instance, some embodiments may apply discriminative classification models. Some embodiments may train two classifiers, one configured to predict when targeted actions happen and one configured to predict when targeted actions do not. Some embodiments may implement a binary classifier configured to create a binary distribution that is output of the classifier and then perform a curve fit to try to identify sensitive regions from the data set. Embodiments may then train a classifier on the sensitive region of the rare event, e.g., with techniques like maximum likelihood estimation.

Locale-Aware Computer Models

Many existing computer models are not well suited for use cases with training data leveraging location, geography, co-location, point of interests (POI), collection of points of interest, trajectory (collectively or individually for locales) for problems in the domain of machine learning, e.g., cases in which the historical records exhibit variability in event location that are being predicted or signals predictive of those outcomes relative to the number of historical records, complexity of the system being modeled, or need for the system to generalize out of sample. In many cases, feature engineering imposes information loss that aggravates these challenges. For example, some computer models naïvely bin events into artificial limited bins such as zip code or state or city without regard to how distant those locals are relative to examples of outcomes being predicted in the historical records and without regard to how varied those events are within the geographic bins. Some computer models naïvely bin locations into limited bins based solely on the physical dimensions of space (latitude, longitude, elevation) and ignore the meaning of locations ("gym", "home", etc.). Some computer models naïvely bin locations as 1-tuple and ignore the meaning of trajectories. The resulting loss of information often leads to higher rates of type I and type II errors from many existing computer models. None of which is to suggest that this type of feature engineering is disclaimed or that any other description of advantages or problems constitutes disclaimer elsewhere herein, as some embodiments may implement this type of feature engineering in conjunction with other features having different properties.

Some embodiments mitigate some of the above-describe challenges with certain classes of machine learning models configured to be trained on and predict based on engineered features that account for particular measures of roaming behavior and distance of event locations preceding targeted outcomes, referred to herein as targeted events or actions. In some embodiments, these techniques may be implemented in conjunction with the predictive systems described in U.S. patent application Ser. Nos. 15/456,059; 16/151,136; 62/740,858 and 16/127,933, the contents of which are hereby incorporated by reference, in a manner like that discussed above with time-based approaches. In some embodiments, the described customer journeys may serve as the historical records or other types of entity logs upon which systems are trained and to which systems are responsive at inference time. In some embodiments, the privacy preserving techniques may be implemented with the approaches described herein. In some cases, the multi-stage machine learning models described may include a stage corresponding to the models described herein.

In some embodiments, training data and inputs at inference time may be, or may be based on, entity logs like those described above. In some embodiments, the events are labeled with some indicia of geolocation, like coordinates of latitude/longitude, a point of interest (POI), a semantic point of interest (POI), a user POI-based daily trajectories, traversal of geofences (e.g., within a radius around a center point or within a polygon defined by latitude/longitude coordinate vertices), dwells (e.g., a visit to a geofence for more than a threshold duration of time), and the like. In some cases, the logged geolocations are based on locations reported by native applications of mobile devices, which may be sensed based on signals from cellular towers in range, WiFi™ networks in range, or GPS signals. In some cases, locations are logged by geocoding IP addresses of network communications from computing devices. In some cases, the records pertain to mobile entities, like people, vehicles, drones, or the like. Some embodiments may access a geographic information system, e.g., with a query specifying a latitude/longitude to obtain POI and attributes thereof corresponding to the latitude/longitude.

A location may be determined to be within a polygon with a variety of techniques. Some such embodiments may execute a a winding number algorithm or a ray-casting algorithm to determine whether a location is within a polygon. For instance, some embodiments may determine whether a geolocation is within a polygon by counting a number of times a ray originating at a given location intersects a side of a polygon defining a geofence and, then, determining whether the current location is within the geofence based on whether the count is odd (corresponding to being inside) or even (corresponding to being outside). In some such implementations, every edge of the polygon may be tested for intersection with the ray, and vertices may be tested for intersection with the ray and tracked in memory as already having been deemed intersected to avoid double counting of vertices for adjacent sides. Alternatively, or additionally, a given geolocation may be determined to be in a polygon by summing angles between rays extending from the current location and vertices defining each sequential side of the polygon. Some embodiments may determine a given geolocation to be inside the polygon in response to determining that the sum is non-zero. Some embodiments may calculate such angles according to an inverse trigonometric function, or to expedite processing and avoid computationally expensive calculations, some embodiments may leverage the closed shape of the polygon and simply account for which quadrant each additional edge places each sum.

In some cases, systems and processes like those described above may apply related techniques to location data. As shown in FIG. 1 and as discussed above, in some embodiments, a targeted action 20 may be assigned with an occurrence likelihood of an entity get engaged with the targeted action 20. In some embodiments, an occurrence likelihood may be predicted for a given geographic locale in the future that an entity will get engaged with the targeted action 20. In some embodiments, a plurality of occurrence likelihoods may be predicted for an entity to get engaged with a plurality of targeted actions 20, e.g., in different geographic areas and time periods. In some embodiments, a plurality of scores may be predicted, where each score is indicative of likelihood of an entity engaging in a targeted behavior in a different respective geographic locale in the future. In some embodiments, a plurality of scores may be predicted, where each score is indicative of likelihood of an entity engaging in a different targeted behavior in a respective geographic locale in the future.

In some embodiments related to use cases with sparse training dataset in which the historical records exhibit relatively few instances of outcomes that are being predicted, detection and recognition of events, via ontology, may result in finding similar events and non-event attributes related to other entities that may be injected into an event stream of an entity to enrich the training dataset. For example, if a given person's historical records exhibit relatively few records of the person's preference for an internet provider in a specific geographic locale, the training dataset may be enriched by addition of historical records (events and non-event attributes) from the person's neighbor who lives in the same geographic locale and the ontology shows similar behavioral patterns for the person and their neighbor.

In some embodiments, ontology 24 semantics may be used to detect what events would not provide meaningful organization by location. Such events may be removed from the training dataset.

In some embodiments, the events may be organized by location using a semantic organization like that discussed above. In some embodiments, n-tuples may be classified by geographic locales, co-location, point of interests (POI), collection of points of interest, or trajectory (collectively or individually locales), along with the other classifications discussed above. In some cases, events may be organized as vectors, where various scalars correspond to various indicia of geolocation. In some embodiments, the events may be classified in a plurality of ordered n-tuples of concept nodes with a relation label. The nodes may be a partially ordered hierarchy based on the relation labels.

In some embodiments, the events may be organized into a taxonomy or ontology of locations in which the events occur or are otherwise associated. In some embodiments, the events are labeled with classifications or with scores, like in dimensions of a vector, indicating a degree to which particular properties are exhibited by the event in the taxonomy or ontology. In some embodiments, the taxonomy is a hierarchical taxonomy.

Aggregating all (or a subset of) events over the trajectory of a human actor (or other entity), in some use cases, and for some embodiments, based on location (e.g., area; class, like home or work; or type in a hierarchy, like retail→sporting goods→Bob's Golf World Stores) may provide features upon which make predictions, and in some cases, the features may be weighted by recency and frequency or otherwise associated with features like those discussed above. For instance, locations visited rarely may not provide as much insight as locations visited on a regular basis for some types of locations, while other types of locations may not be as sensitive to recency and frequency. For example, a location-based event effective 50 miles away might not play a role in making the decision to purchase an insurance plan today, but an offer effective 5 miles would. On the other hand, a pattern of diverse travel, even in the distant past, may signal a willingness to try new brands.

In some embodiments, ontology semantics may use feature engineering to classify and sort different types of features (e.g. events and non-event attributes). Feature engineering may include distance feature engineering, roaming feature engineering, semantic embedding feature engineering, and modal feature engineering.

Distance features engineering may leverage the last location an event took place. In some embodiments, distance features may be ranked and classified, e.g., using ontology and taxonomy semantics, to reveal patterns of behavior. For example, distance features engineering may reveal an average distance a given client may travel to buy cosmetic products. In some embodiments, the recency features may be calculated by counting a number of distance units (e.g., meters) between the last time an event type (or abstracted event type based on an ontology) occurred. In one embodiment, event types that take place within a specific distance window can be combined into a single event. This is expected to be helpful when multiple activities are recorded as part of a single commuting event (like the different tasks of driving to train station, parking, taking the underground train, and emerging at known station).

Roaming features engineering is expected to capture how often a specific event type or multiple event types (e.g., as a combination) occurs in the defined specific locales for the problem at hand. In some embodiments, frequency features may be calculated by summing of interaction events occurring in a pre-defined (or dynamically defined) or optimized aggregation window.

Using difference feature engineering, the features may be generated by creating the difference of a given feature of any kind (distance, roaming, semantic) between two geographic locales. With the help of difference feature engineering, embodiments may make geographic locales homogenous from a volume of actions sequences, which is expected to make them easier to model.

Semantic embedding feature engineering may be used to associate a word in a sentence with a mobility trajectory made by a human actor over a set period of time. Semantic embedding feature engineering, in some cases, leverages the fact that individuals often have a high degree of temporal and spatial regularity, feature engineering have points of interest (POIs), places they frequent with high probability. Trajectories may be encoded as series of POIs. A human actor's trajectory, in some cases, can be used by some models herein to explain and classify behavior.

In some embodiments, a set of geolocated events corresponding to an individual may be transformed into an embedding space (e.g., a lower dimensional continuous vector representation of the set of geolocated events), e.g., with an autoencoder. This may be, in some embodiments, performed by breaking a human actor's trajectory into a finite number of bins based on, e.g., either duration (like 48 bins per day) or location on grid width (like 200 m by 200 m squares). These grids or bins are referred to as Geo-Temporal Sentences (GTS). After processing the raw data of a human actor's locations, which may include latitude, longitude, and timestamps, into Geo-Temporal Sentences over set period of time. "Sentences" may be formed using techniques like those in the context of word embedding used for natural language processing, except that the order of the Geo-Temporal Sentences may also be treated as a feature. In some embodiments, the system may apply embedding by the word2vec algorithm to human actor location data. Or various other types of autoencoders may be applied to map a sequence, like a GTS, to a vector in a relatively high dimensional vector space (which may be lower dimensional that input vectors), where proximity of vectors may indicate similarity. Some embodiments may apply an autoencoder with attention, like that described in a paper titled Attention Is All You Need, Vaswani et al, 6 Dec. 2017, v5, arXiv: 1706.03762, the contents of which are hereby incorporated by reference.

In some embodiments, events or locations thereof may be modeled as a graph with nodes corresponding to events or locations (or types thereof) and directed edges corresponding to transitions therebetween the obtained event logs. In some embodiments, a measure of centrality of nodes of the graph may be computed to determine model predictive value of such nodes and, in some cases, weight (which may include pruning) features corresponding to such nodes accordioning in the models herein. Examples include Shapley values of nodes and eigenvector centrality of nodes, or variants thereof, like PageRank scores of such nodes.

In some embodiments, a convolutional neural network (CNN) may be trained and used to detect high-frequency sub-sequences of GTS co-occurring POIs associated with the behavior.

In some embodiments, a long short-term memory (LSTM), bidirectional LSTM (BLSTM), Contextual LSTM (CLSTM) recurrent neural network may be trained to use the temporal order of sequences of Geo-Temporal Sentences to classify trajectories to behavior using a flexible memory framework. Predicting a behavior based on a never-seen-before mobility pattern in a trajectory of known or novel human actors may also allow future sub-sequences besides past ones in the trajectory to contribute to the prediction.

In some embodiments, modal feature engineering such as moving average, median, standard deviation, kurtosis over a rolling window can be used if the data was not too sparse (meaning having enough number of events of the same type in data).

In addition to creating new features through feature engineering, some embodiments can also reduce the number of features to improve performance of the model. In some embodiments, a Bayesian Network may be used to determine the dependency level among feature a set, such that the Markov blanket of a significant event may be used to determine the optimal set of features to build the model.

In some embodiments, a logistic regression method using Lasso and ElasticNet penalty functions may be used to reduce a number of features. As noted above, examples of regression methods include least absolute shrinkage and selection operator (e.g., Lasso), Elastic Net, and Tikhonov regularization. In some embodiments, the Pearson correlation is used for feature reduction. In some embodiments, t-distributed stochastic neighbor embedding (t-SNE), a non-linear dimensionality reduction algorithm, is used for feature reduction. In some embodiments, stepwise backward selection using p-value, stepwise backward selection using p-value using Akaike information criterion, least absolute shrinkage and selection operator, Boruta is used for feature reduction.

The preceding forms of feature engineering may be combined in a single feature, and different features may have different forms of the above types of feature engineering, in either case, in any permutation.

As shown in FIG. 2, in some embodiments, the above-described labeling module 28 may (also, or instead) create a plurality of geographic locales (or a plurality of co-locations or collection of points of interest), based on the events geographic locale, using ontology semantics and distance feature engineering. Each geographic locale of the plurality of geographic locales may be scored based on the type of events in each geographic locale, calculated by ontology 24 semantics and taxonomy 32 semantics, for a targeted action. For instance, an Italian car dealership located 50-miles away from a potential client's house might not be the best probable location for the client to purchase a next vehicle, but an Italian car dealership location only a mile away from the client's house would. On the other hand, some of the historic information such as his past cars may reveal the potential client is not a fan of Italian cars and prefers German cars; based on this record, the geographic locales may be scored to place German car dealerships at higher rankings.

A plurality of geographic locales may have an equal or different sizes, may have overlapping regions, may be adjacent to each other or separated. For example, a first geographic locale may be a radius of 10-miles centered at a potential client's house, a second geographic locale may be a radius of 5-miles centered at a potential client's house, and a third geographic locale may be a radius of 3-miles centered at a potential client's work address, overlapping with the first geographic locale, separated from the second geographic locale and smaller area than both the first and the second geographic locales. Areas may be specified by point and radius, polygons, collections of tiles in a regular or irregular tiling, and encodings may include latitude and longitude or positions on space filling curves, like Hilbert curves, z-curves, Morton curves, or the like.

In some embodiments, a plurality of geographic locales may include areas covering daily commute routes of a potential client. For example, the labeling module 28 may rank a first geographic locale 10 away miles from a potential client's house higher than a second geographic locale 5 miles away from the potential client's house because the first geographic locale is only a mile away from the route which the potential client passes to go to work every day.

In some embodiments, patterns may include predetermined patterns or dynamically determined patterns (or both), and such patterns may be detected in real-time of later. Patterns may include combinations of singular location types, location streams, and other patterns. Real-time detected patterns may be dynamically recognized within events by ontology 24 semantics or taxonomy 32 semantics.

In some embodiments, the controller 10 may train a model based on the entity log repository 12 to predict whether an entity will engage in a targeted action in a given geographic locale in the future, such as the actions within the targeted action repository 22.

In some embodiments, the controller 10 is configured to score, rank, or otherwise select a plurality of candidate actions responsive to location information in the entity events 14 with the trained model. In some cases, those candidate actions are stored in a targeted action repository 22. In some embodiments, as noted above, the actions may include those described as being selected among in U.S. patent application Ser. No. 15/456,059, titled BUSINESS ARTIFICIAL INTELLIGENCE MANAGEMENT ENGINE, the contents of which are hereby incorporated by reference.

In some embodiments, the process 100 shown in FIG. 3 may account for location. For instance, some embodiments may process features that classify an entity log or targeted action therein according to whether a specific tied type of other event occurred within a distance (Euclidian, as the crow flies, commuting distance) to that targeted action. Examples include features that classify an entity log or targeted action therein according to whether a specified type of event occurred within a location in a specific direction that targeted action. Other examples include features that classify an entity log or targeted action therein in these manners according to whether more than a threshold number of instances of the specified event occurred within the specified geographic locale. Examples of numerical features include a distance before a targeted action that a specified type of event occurred or a pattern weighted version thereof, like a half-life score in which the weight attributed to the specified type of action decreases exponentially as the amount of distance increases. Other examples of numerical features include a frequency or other indication of a number of times the specified type of event occurred within a geographic locale before the targeted action. As a result, some embodiments may produce a trained predictive model, as indicated by block 36 in FIG. 1.

In some embodiments, the trained model may then be used to predict whether an entity characterized by a set of inputs to the model will engage in a targeted action in a given geographic locale in the future. To this end, some embodiments may receive targeted actions, as indicated by block 110 in FIG. 3, for instance, with the trained predictive model 36 shown in FIG. 1. Some embodiments may then predict whether an entity will engage in the targeted actions 110, as indicated by block 112 in FIG. 3, for instance with a potential targeted action 20 in FIG. 1.

To the above-described ends and others, some embodiments may execute an inference-time process, which may use a trained model to make inferences (or classifications) and take responsive action. In some cases, outputs maybe provided within less than 500 milliseconds of receiving a given input. Based on the output, some embodiments may cause a communication to be sent to a user to which the inputs pertain or a signal to be sent to an actuator in an industrial process to which the inputs pertain, e.g., to adjust a valve, modulate current or voltage, or otherwise change an amount of energy entering or exiting a system.

In some cases, training and inference may be expedited with hardware acceleration, in some cases, with hardware optimized differently for each activity. In some cases, the above-described processes may execute on a heterogenous set of processes in which a CPU cooperates with various other processors, like GPU's (graphics processing units), tensor processing units, inference-optimized or training-optimized field programmable gate arrays, and other types of hardware accelerators. In some cases, the accelerator may have a relatively large number of processor cores operating concurrently, e.g., more than 50 or more than 500, on relatively low-resolution representations of data, like 16, 8, 4, or fewer bit integer values. In some cases, such hardware may be configured to operate on data in a floating-point radix format, like bfloat 16.

In some cases, when model parameters during training (and particularly during certain matrix operations on large matrices of such parameters or partial derivatives thereof with respect to an objective function), transfers of data within a memory hierarchy of a computer system (e.g., from persistent storage, to dynamic random access memory, to L3 cache, to L2 cache, to processor registers) may be relatively expensive, as transfers are often slow, and often memory space may be particularly limited closer to the processor. For instance, access to registers of a CPU or graphics processing unit may be relatively fast, while space may be relatively limited. Level 2 and level 3 cache may offer increasing magnitude of volume, trading off slower read times. Similarly, system memory, like dynamic random access memory, may offer even greater volume, though access times may be several orders of magnitude slower. Matrices processed by some embodiments may be too large to concurrently fit into the higher levels of a memory hierarchy. As a result, during matrix operations, portions of the matrix may be swapped in and out of the higher levels of memory hierarchy, which may account for a substantial portion of the computing resources, e.g., time and memory, consumed.

Some embodiments may expedite computation of model parameters during training with basic linear algebra subprograms, like level 1, 2, or 3 commands. Some embodiments may compute these measures with vector registers and single-instruction multiple data instructions supported by the processor. Some embodiments may multiply matrices by invoking the GEMM (GEneral Matrix to Matrix Multiplication) function of a BLAS library.

In some embodiments a blocking algorithm may be used to multiply two matrices (e.g., when at least one is a relatively dense matrix), to improve the functioning of the computer system and reduce the amount of time spent shifting data back and forth between levels of a memory hierarchy. In some embodiments, the matrices (e.g., one or both) may be segmented into blocks, each having contiguous positions of values within the matrix, for instance, those values that are both in the first 4 or 8 columns and in the first 4 or 8 rows might constitute one block. In some embodiments, block size may be selected based on the amount of available memory at various levels of a memory hierarchy, so that a block can fit within a targeted level of the hierarchy, like the level 2 or level 3 cache. Some embodiments may iterate through the blocks, loading the blocks into a higher level of the memory hierarchy from a lower level, before performing operations with that block. In some embodiments, a given block, after being loaded into the higher level the memory hierarchy, may be applied to update each implicated value of a resulting matrix (e.g., a product). In some cases, the values of the matrix may be initialized to zero, and then may accumulate updates as blocks are processed. After all blocks have been so processed, and the output matrix may be complete. In some cases, updating values is performed by summing an existing value with products of values computed with the higher level of the memory hierarchy.

Figure 4:
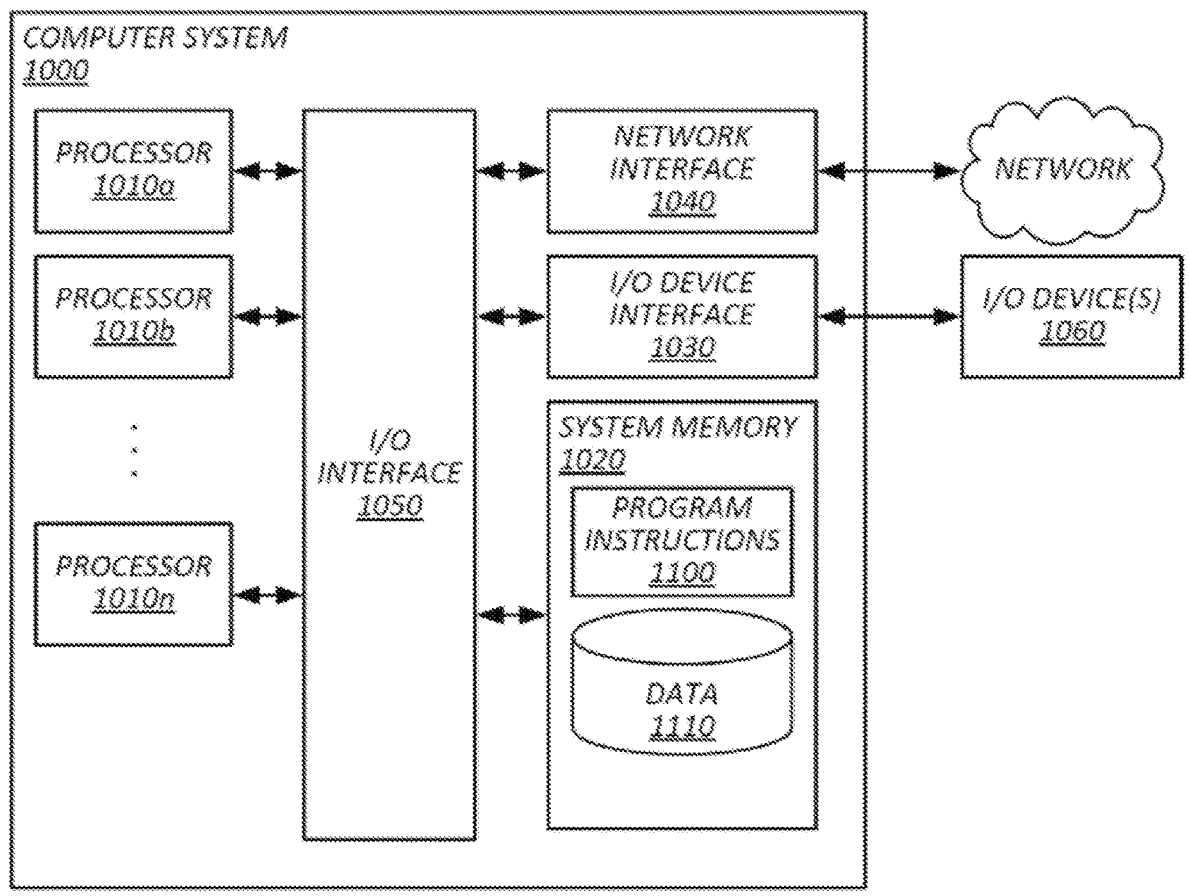
FIG. 4 shows an example of a computing device by which the above-describe techniques may be implemented.

In some embodiments, sparse-matrices representing transformations of data described above may consume a relatively large amount of memory. To conserve memory, some embodiments may compress the matrices by decomposing each matrix into vectors, and translating the vectors into an index indicating which vector scalars have a nonzero value and corresponding indications of those values. Some embodiments may compress such vectors, e.g., with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an." and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating." "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, for a plurality of entities, entity logs, wherein: the entity logs comprise events involving the entities, a first subset of the events are actions by the entities, at least some of the actions by the entities are targeted actions, and the events are labeled according to an ontology of events having a plurality of event types; transforming, with one or more processors, each entity log into a collection of features to which the predictive machine learning model is capable of responding; training, with one or more processors, based on the transformed collection of features from the entity logs, a predictive machine learning model to predict whether an entity characterized by a set of inputs to the model will engage in a targeted action in a given duration of time in the future; and storing, with one or more processors, the trained predictive machine learning model in memory.

2. The medium of embodiment 1, comprising predicting whether a given entity will engage in a targeted action with the trained predictive machine learning at least in part by: obtaining a given entity log of the given entity; determining a plurality of features from the given entity log, the plurality of features having fewer dimensions than the given entity log; and inputting the determined plurality of features into the trained predictive machine learning model to cause the model to output a value indicative of the whether the given entity will engage in a targeted action within the given duration of time in the future, wherein: the trained model is configured to make predictions based on features indicative of recency of events prior to targeted actions.

3. The medium of embodiment 1, wherein: the predictive machine learning model is based on a plurality of decision trees combined with an ensemble procedure; and at least some of the decision trees are trained with classification and regression tree (CART) learning by recursively splitting a feature space of inputs to the predictive machine learning model along different dimensions of the feature space at values of respective dimensions that locally optimize the respective split to minimize entropy of Gini impurity of targeted actions and non-targeted actions on each side of respective splits.

4. The medium of embodiment 3, wherein the ensemble procedure comprises boosting.

5. The medium of embodiment 3, wherein the ensemble procedure comprises random forest or rotation forest.

6. The medium of any one of embodiments 1-5, wherein at least some of the features are determined by classifying whether a given type of non-targeted-action event occurred with a range of time prior to a targeted action.

7. The medium of any one of embodiments 1-6, wherein: the trained model is configured to make predictions based on features indicative of frequency of events prior to targeted actions; and at least some of the features are determined by classifying an amount of times a given type of non-targeted-action event occurred with a range of time prior to a targeted action.

8. The medium of any one of embodiments 1-7, wherein at least some of the features are determined based on an amount of time a first type of non-targeted-action event occurred prior to a targeted action.

9. The medium of any one of embodiments 1-8, wherein a given one of the features is determined based on a first amount of time a first type of non-targeted-action event occurred prior to a targeted action and based on a second amount of time a second type of non-targeted-action event occurred prior to a targeted action.

10. The medium of any one of embodiments 1-9, wherein a given one of the features is determined based on first amounts of time and based on a first number of times a first type of non-targeted-action event occurred prior to a designed targeted action.

11. The medium of embodiment 10, wherein the given one of the features is determined based on second amounts of time and based on a second number of times a second type of non-targeted-action event occurred prior to the designed targeted action.

12. The medium of any one of embodiments 1-11, wherein: a second subset of events are actions taken on the entities by others; at least some features upon which the model is trained are based on events in the second subset; and at least some features upon which the model is trained are based on events in the first subset.

13. The medium of any one of embodiments 1-12, wherein: the entities include consumers; the events include communications to consumers by an enterprise; the events include purchases by consumers from the enterprise; the events include non-purchase interactions by consumers with the enterprise; and the entity logs are obtained from a customer relationship management system of the enterprise.

14. The medium of embodiment 13, wherein: the enterprise is a credit card issuer and the trained predictive machine learning model is configured to predict whether a consumer will default; the enterprise is a lender and the trained predictive machine learning model is configured to predict whether a consumer will borrow; the enterprise is an insurance company and the trained predictive machine learning model is configured to predict whether a consumer will file a claim; the enterprise is an insurance company and the trained predictive machine learning model is configured to predict whether a consumer will sign-up for insurance; the enterprise is a vehicle seller and the trained predictive machine learning model is configured to predict whether a consumer will purchase a vehicle; or the enterprise is a seller of goods and the trained predictive machine learning model is configured to predict whether a consumer will file a warranty claim.

15. The medium of any one of embodiments 1-14, wherein: at least some of the features are not temporality or sequentially adjacent a targeted action.

16. The medium of any one of embodiments 1-15, wherein: at least some of the features overlap in respective ranges of time or sequence to which they pertain.

17. The medium of any one of embodiments 1-16, wherein: the trained predictive machine learning model is configured to output a plurality of scores each indicative of likelihood of an entity engaging in a targeted behavior in a different respective duration of time in the future.

18. The medium of any one of embodiments 1-17, wherein: the trained predictive machine learning model is configured to output a plurality of scores each indicative of likelihood of an entity engaging in a different respective targeted behavior in the given duration of time in the future; and the operations comprise: inputting more than 1,000 entity logs corresponding to more than 1,000 entities into the trained machine learning model; and selecting a subset of the more than 1,000 entities predicted to engage in a targeted action by the trained predictive machine learning model.

19. The medium of embodiment 18, comprising: causing one or more messages to be sent to members of the selected subset of entities responsive to the selection.

20. The medium of any one of embodiments 1-19, wherein the ontology of events comprise: a primary level comprising a plurality of exogenous actions; and a secondary level comprising a plurality of endogenous actions, wherein: a numerical score is assigned to each exogenous action and endogenous act; the numerical score assigned to each exogenous action is higher than the numerical score assigned to each endogenous act; and an aggregate score is calculated based on a weighted combination of numerical scores.

21. The medium of any one of embodiments 1-20, wherein the trained model is configured to filter some of the features of entity logs, wherein the filtration comprises applying: a dependency level among the features of entity logs determined by a Bayesian Network; a logistic regression calculated by a Lasso and ElasticNet penalty function; or a product moment correlation coefficient calculated by a Pearson correlation.

22. The medium of embodiment 21, wherein the filtration comprises applying: a dependency level among the features of entity logs determined by a Bayesian Network; a logistic regression calculated by a Lasso and ElasticNet penalty function; and a product moment correlation coefficient calculated by a Pearson correlation.

23. The medium of any one of embodiments 1-22, wherein the predictive machine learning model is a real-time model, configured to adjust model parameters as new entity log entries are obtained.

24. The medium of any one of embodiments 1-23, wherein the predictive machine learning model is configured to accommodate sparse entity logs by applying discriminative classification models.

25. The medium of any one of embodiments 1-24, wherein the events are further labeled according to a hierarchical taxonomy of events having a plurality of event types.

26. The medium of any one of embodiments 1-25, wherein the targeted actions are outcomes of an industrial process controlled over time.

27. A tangible, non-transitory, machine-readable medium storing instructions that when executed by one or more processors effectuate operations comprising: obtaining, with one or more processors, for a plurality of entities, entity logs, wherein: the entity logs comprise events involving the entities, a first subset of the events are actions by the entities, at least some of the actions by the entities are targeted actions, and the events are labeled according to an ontology of events having a plurality of event types; training, with one or more processors, based on the entity logs, a predictive machine learning model to predict whether an entity characterized by a set of inputs to the model will engage in a targeted action in a given geographic locale in the future; and storing, with one or more processors, the trained predictive machine learning model in memory.

28. The medium of embodiment 27, wherein: the trained model is configured to make predictions based on features of entity logs indicative of location measurements of events outside to targeted geographic locale; and the operations comprise predicting whether a given entity will engage in a targeted action with the trained predictive machine learning at least in part by: obtaining a given entity log of the given entity; determining a plurality of features from the given entity log, the plurality of features having fewer dimensions than the given entity log; and inputting the determined plurality of features into the trained predictive machine learning model to cause the model to output a value indicative of the whether the given entity will engage in a targeted action within the geographic locale in the future.

29. The medium of any one of embodiments 27-28, wherein: the predictive machine learning model is based on a plurality of decision trees combined with an ensemble procedure; the ensemble procedure is boosting, random forest or other form of bootstrap aggregation, or rotation forest; and at least some of the decision trees are trained with classification and regression tree by recursively splitting a feature space of inputs to the predictive machine learning model along different dimensions of the feature space at values of respective dimensions that locally optimize the respective split to minimize entropy of Gini impurity of targeted actions and non-targeted actions on each side of respective splits.

30. The medium of any one of embodiments 27-29, wherein: the predictive machine learning model comprises a cyclic directed graph of perceptrons; and weights and biases of the cyclic directed graph of perceptrons are adjusted by unrolling the cycles and iteratively, until a stopping condition: determining a partial derivative of an objective function relative to each weight and bias, the objective function being based on an amount of aggregate error between predictions of the model and a training set; and adjusting the weights and biases in directions that the partial derivatives indicate locally optimize the objective function by reducing the amount of error.

31 The medium of any one of embodiments 27-30, wherein: the predictive machine learning model comprises a recurrent neural network.

32. The medium of any one of embodiments 27-31, wherein: the predictive machine learning model comprises a long-short term memory model.

33. The medium of any one of embodiments 27-32, comprising, before training, transforming each entity log into a collection of features to which the predictive machine learning model is capable of responding and training the model on the resulting features.

34. The medium of embodiment 33, wherein at least some of the features are determined by classifying whether a given type of non-targeted action event occurred with a range of geographic locale outside to a targeted action in geographic locale.

35. The medium of embodiment 33, wherein: wherein the trained model is configured to make predictions based on features of entity logs indicative of roaming patterns of events prior to targeted actions; and at least some of the features are determined by classifying a roaming amount associated with a given type of non-targeted action event occurred with a distance range of geographic locale outside to a targeted geographic locale action.

36. The medium of embodiment 33, wherein at least some of the features are determined based on a roaming amount a first type of non-targeted action event occurred outside to a targeted geographic locale.

37. The medium of embodiment 33, wherein a given one of the features is determined based on a distance measure between the geographic locale a first type of non-targeted action event occurred prior to a targeted action and based a distance measure of a second type of non-targeted action event occurred outside to a targeted geographic locale.

38. The medium of embodiment 33, wherein a given one of the features is determined based on first roaming measure and based on a first roaming measure a first type of non-targeted action event occurred outside to a designed targeted geographic locale.

39. The medium of embodiment 38, wherein the given one of the features is determined based on second roaming measure and based on a roaming measure a second type of non-targeted action event occurred outside the designed targeted geographic locale.

40. The medium of any one of embodiments 27-39, wherein: a second subset of events are actions taken on the entities by others; at least some features upon which the model is trained are based on events in the second subset; and at least some features upon which the model is trained are based on events in the first subset.

41. The medium of any one of embodiments 27-40, wherein: the entities include consumers; the events include communications to consumers by an enterprise; the events include purchases by consumers from the enterprise; the events include non-purchase interactions by consumers with the enterprise; and the entity logs are obtained from a customer relationship management system of the enterprise.

42. The medium of embodiment 41, wherein: the enterprise is a credit card issuer and the trained predictive machine learning model is configured to predict whether a consumer will default; the enterprise is a lender and the trained predictive machine learning model is configured to predict whether a consumer will borrow; the enterprise is an insurance company and the trained predictive machine learning model is configured to predict whether a consumer will file a claim; the enterprise is a wireless company and the trained predictive machine learning model is configured to predict whether a consumer will sign-up for service renewal; the enterprise is a vehicle seller and the trained predictive machine learning model is configured to predict whether a consumer will purchase a vehicle; or the enterprise is a seller of goods and the trained predictive machine learning model is configured to predict whether a consumer will file a warranty claim.

43. The medium of any one of embodiments 27-42, wherein: the trained predictive machine learning model is configured to output a plurality of scores each indicative of likelihood of an entity engaging in a targeted behavior in a different respective geographic locale in the future.

44. The medium of any one of embodiments 27-42, wherein: the trained predictive machine learning model is configured to output a plurality of scores each indicative of likelihood of an entity engaging in a different respective targeted behavior in the given geographic locale in the future.

45. The medium of any one of embodiments 27-44, comprising: inputting more than 1,000 entity logs corresponding to more than 1,000 entities into the trained machine learning model; and selecting a subset of the more than 1,000 entities predicted to engage in a targeted action by the trained predictive machine learning model.

46. The medium of embodiment 45, comprising: causing one or more messages to be sent to members of a selected subset of entities responsive to the selection.

47. The medium of any one of embodiments 27-46, wherein the ontology of events comprise at least two type of feature engineering listed below: distance feature engineering, roaming feature engineering, semantic embedding feature engineering, and modal feature engineering.

48. The medium of any one of embodiments 27-47, where the given geographic locale corresponds to a: geographic area, administrative area, point of interest, geographic area tuple, embedded geographic area pair, geo-temporal sentence, set of point of interest, trajectory, indoor area, outdoor area, area served by a wireless transmitter or receiver, or taxation area.

49. A method, comprising: the operations of any one of embodiments 1-48.

What is claimed is:

1. A method comprising:
obtaining, with a computer system, an entity log, wherein:
the entity log comprises events involving the entity,
a first subset of the events are actions by the entity,
the events are labeled according to an ontology of events having a plurality of event types,
the entities include consumers,
the events include communications to consumers by an enterprise,
the events include purchases by consumers from the enterprise,
the events include non-purchase interactions by consumers with the enterprise, and
the entity logs are obtained from a customer relationship management system of the enterprise; and
determining, with the computer system, based on a predictive machine learning model, for the entity characterized by the entity log a likelihood that the entity will engage in a target action in a given duration of time in the future.

2. The method of claim 1, further comprising:
obtaining, with the computer system, training data comprising:
for a plurality of entities, entity logs, wherein:
the entity logs comprise events involving the entities,
a first subset of the events are actions by the entities,
at least some of the actions by the entities are the target action, and
the events are labeled according to the ontology of events having a plurality of event types;
training, with the computer system, the predictive machine learning model to predict whether a given entity characterized by a given entity log will engage in the targeted action in the given duration of time in the future; and
storing, by the computer system, the trained predictive machine learning model in memory.

3. The method of claim 1, wherein:
the predictive machine learning model is an autoencoder with attention wherein the autoencoder is configured to map the entity log into a vector representation and wherein at least some dimensions of the vector representation correspond to a predicted likelihood that the entity will engage in the target action in the given duration of time in the future.

4. The method of claim 1, further comprising transforming the entity log into an embedded space, and wherein determining the likelihood that the entity will engage in a target action comprises determining for the entity characterized by the embedded space a likelihood that the entity will engage in the target action in the given duration of time in the future.

5. The method of claim 1, wherein determining for the entity the likelihood that the entity will engage in a target action in the given duration of time comprises determining a likelihood that the entity will engage in sequence of events including the target action.

6. The method of claim 1, further comprising steps for training the predictive machine learning model.

7. The method of claim 1,
wherein the entity log further comprises attributes of the entity,
wherein a second subset of the events are events associated with geographic locales;
wherein determining for the entity the likelihood that the entity will engage in the target action comprises determining for the entity the likelihood that the entity will engage in the target action in a given geographic locale.

8. The method of claim 7, further comprising determining a sequence of geographic locales based on the entity log and wherein determining the likelihood that the entity will engage in the target action in the given geographic locale comprises determining the likelihood that the entity will engage in the in the target action in the given geographic locale based on the sequence of geographic locales.

9. The method of claim 8, wherein:
the predictive machine learning model is an autoencoder with attention wherein the autoencoder is configured to map geographic locales of the entity log into a vector representation and wherein at least some dimensions of the vector representation correspond to a predicted likelihood that the entity will engage in the target action in the given geographic locale in the given time in the future.

10. The method of claim 7, wherein the geographic locales are divided into geographic bins corresponding to an entity's trajectory.

11. The method of claim 7, wherein multiple events associated with geographic locales which are within a threshold distance are combined into a single event.

12. The method of claim 7, wherein;
the predictive machine learning model is configured to map a sequence of geographic locales of the entity log into a vector representation and wherein proximity in at least some dimensions of the vector representation corresponds to similarity of given sequences of geographic locales.

13. The method of claim 12, wherein:
determining the likelihood that the entity will engage in the target action comprises determining a similarity of the sequence of geographic locales of the entity log to other sequences of geographic locales for a plurality of entities.

14. The method of claim 13, wherein the sequence of geographic locales is a Geo-Temporal Sentence (GTS).

15. The method of claim 1, wherein:
a third subset of events are actions taken on the entity by others and wherein determining for the entity the likelihood that the entity will engage in the target action based on the actions taken on the entity by others.

16. The method of claim 1, wherein:
the enterprise is a seller of goods and the predictive machine learning model is trained to determine whether a consumer will purchase the goods;
the enterprise is a seller of goods and the predictive machine learning model is configured to predict a distance the consumer will travel to purchase the goods of the enterprise;
the enterprise is a credit card issuer and the predictive machine learning model is configured to predict whether a consumer will default;
the enterprise is a lender and the predictive machine learning model is configured to predict whether a consumer will borrow;
the enterprise is an insurance company and the predictive machine learning model is configured to predict whether a consumer will file a claim;
the enterprise is an insurance company and the predictive machine learning model is configured to predict whether a consumer will sign-up for insurance;
the enterprise is a vehicle seller and the predictive machine learning model is configured to predict whether a consumer will purchase a vehicle; or
the enterprise is a seller of goods and the predictive machine learning model is configured to predict whether a consumer will file a warranty claim.

17. The method of claim 1, comprising:
steps for predicting whether an entity will engage in a target behavior in the future.

18. The method of claim 1, wherein the predictive machine learning model is a real-time model, configured to adjust model parameters as new entity log entries are obtained.

19. A tangible, non-transitory, machine-readable medium storing instructions that when executed by one or more processors effectuate operations comprising:
obtaining, with a computer system, an entity log, wherein:
the entity log comprises events involving the entity,
a first subset of the events are actions by the entity,
the events are labeled according to an ontology of events having a plurality of event types,
the entities include consumers,
the events include communications to consumers by an enterprise,
the events include purchases by consumers from the enterprise,
the events include non-purchase interactions by consumers with the enterprise, and
the entity logs are obtained from a customer relationship management system of the enterprise; and
determining, with the computer system, based on a predictive machine learning model, for the entity characterized by the entity log a likelihood that the entity will engage in a target action in a given duration of time in the future.

20. A method comprising:
obtaining, with a computer system, an entity log, wherein:
the entity log comprises events involving the entity,
a first subset of the events are actions by the entity, and
the events are labeled according to an ontology of events having a plurality of event types; and
determining, with the computer system, based on a predictive machine learning model, for the entity characterized by the entity log a likelihood that the entity will engage in a target action in a given duration of time in the future,
wherein the predictive machine learning model is an autoencoder with attention, wherein the autoencoder is configured to map the entity log into a vector representation, and wherein at least some dimensions of the vector representation correspond to a predicted likelihood that the entity will engage in the target action in the given duration of time in the future.

* * * * *